Sept. 16, 1924.
G. SUNDBACK
COVER
Filed Jan. 8, 1923
1,508,419
2 Sheets-Sheet 1
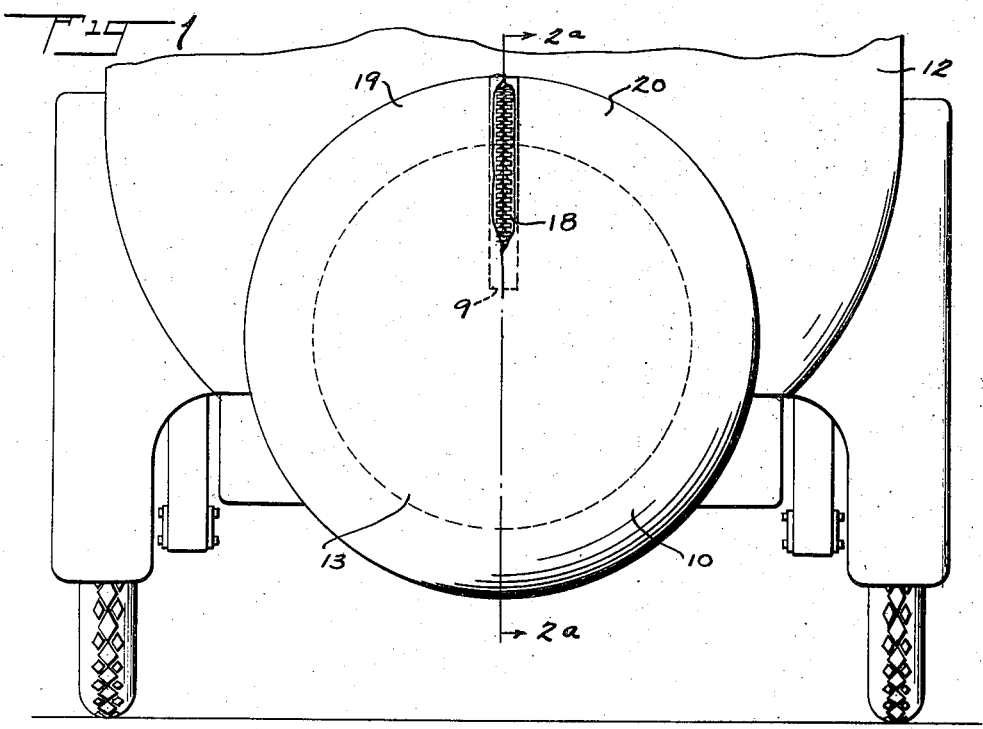
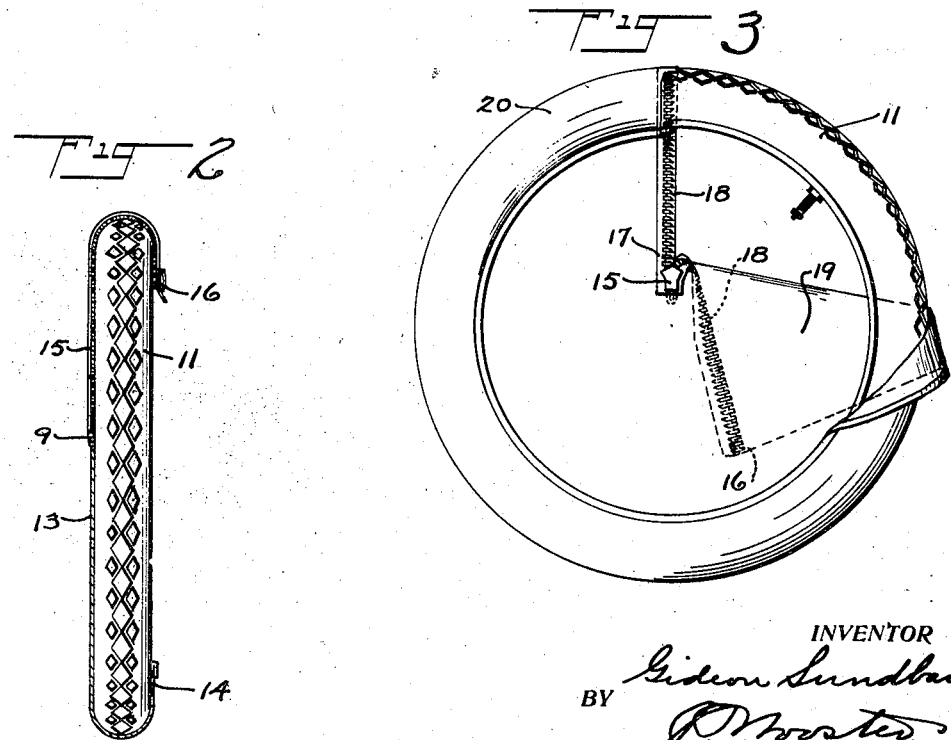
INVENTOR
Gideon Sundback
BY
ATTORNEY

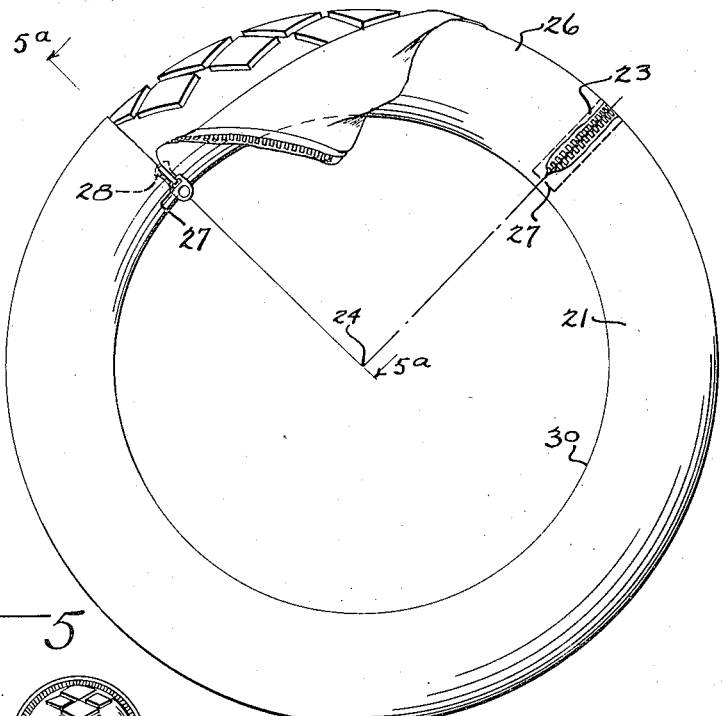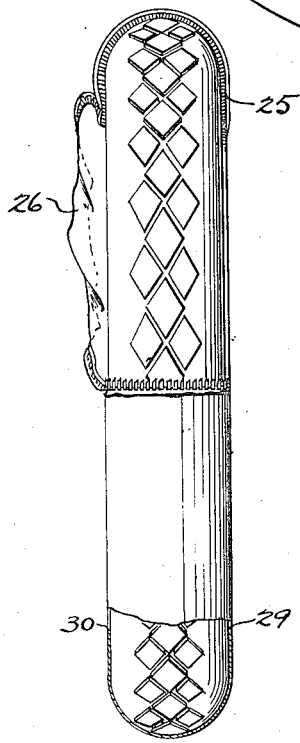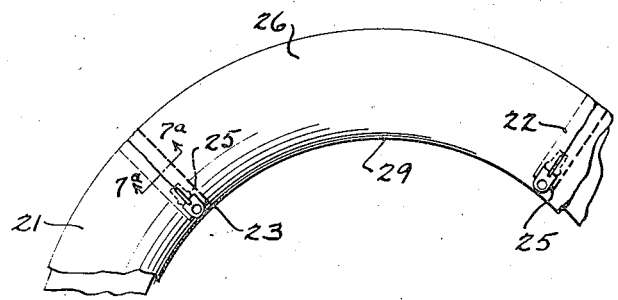

Patented Sept. 16, 1924.

1,508,419

UNITED STATES PATENT OFFICE.

GIDEON SUNDBACK, OF MEADVILLE, PENNSYLVANIA, ASSIGNOR TO HOOKLESS FASTENER COMPANY, A CORPORATION OF PENNSYLVANIA.

COVER.

Application filed January 8, 1923. Serial No. 611,210.

*To all whom it may concern:*

Be it known that I, GIDEON SUNDBACK, a subject of the King of Sweden, and a resident of Meadville, in the county of Crawford and State of Pennsylvania, have invented certain new and useful Improvements in Covers, of which the following is a specification.

This invention relates to coverings for various articles, especially flexible covers which extend on opposite sides and around the edges of such objects as tires, musical instruments, athletic goods, and a wide variety of other articles of generally analogous shape.

Such covers commonly include a flexible material in separate parts, or opened in several places so as to be removable and provided with some form of fastening, such as lacings or snaps, but such fastenings are not convenient to manipulate and the expense of applying them on flaps, or separate pieces sewed to the main piece is excessive.

According to the present invention a covering for spare tires is shown. Such a device covers the outside, extends around the tire circumference, and is provided with an overlapping portion extending more or less on the inner side. To permit removal, one or more slits are provided in the cover closed at one end and open at the other. The cover may not enclose all surfaces of the article and such slits extend from the inner edge of the overlapping portion over the tire and down the opposite side just far enough to enable the cover to be removed when the opposite sides of the slit material are folded back. The use of only one slit requires that this slit extend more nearly to the center, or axis of the tire. When more than one slit is used they may be spaced apart a convenient distance and are of less extent than the single slit. Some convenient form of securing means is used to close this slit and preferably a fastening such as described in my Patent No. 1,243,458, Oct. 16, 1917, is used. It has been discovered that the fastener of this patent will go around an object, like a tire and is movable out of its own plane while still operable with facility. A particular advantage of my present invention resides in the facility with which a slit may be closed when its sides are under tension and when a snap fastener could not be conveniently manipulated.

While this invention is shown and described embodied in a tire cover it will be understood that it may also be applied to flexible coverings for other articles of analogous shape to which the covering may be applied and removed in a similar manner and be adapted to extend on opposite sides as well as enclose the edges.

Referring to the drawings:

Figure 1 shows the cover applied to the spare shoe on the rear of an automobile.

Fig. 2 is a section on the line $2^a$—$2^a$ of Fig. 1, showing the cover, but not the tire, in section.

Fig. 3 is a view of the inner side of the cover with the slit opened and part of the cover peeled back preparatory to removal.

Fig. 4 discloses another embodiment of this invention applied to a tire cover.

Fig. 5 is a section on the line $5^a$—$5^a$ of Fig. 4, but without showing the tire in cross section.

Fig. 6 is a view from the opposite side of the cover shown in Fig. 4.

Fig. 7 is a section on the line $7^a$—$7^a$ of Fig. 6.

By reference to the drawing it may be seen that numeral 10 indicates the tire cover applied over the spare shoe 11, and carried in the customary place on the rear of the automobile 12. The cover completely encloses the outer side 13 of the tire and extends around the circumference and inwardly on the inner, or opposite side 14 part way as shown in Figs. 2 and 3. To permit removal of the cover it is provided with a slit 15 extending from the inner edge 16 of the overlapping portion upward and across the upper edge of the tire 11 and down the opposite or outer side 13 to a point adjacent the axis or center of the tire. The slit 15 just described is only long enough to permit the material 19 and 20 along its opposite edges to be folded back and the cover taken off.

Some appropriate form of fastening means is provided for closing the slit 15, but preferably some type of slide fastener is used, such, for example, as that described in my prior Patent No. 1,243,458, dated October 16, 1917, in which the opposite edges of the slit are provided with interlocking members 18 adapted to be controlled by a slidable operating means 17 movable throughout the length of the slit to progressively interlock or unfasten the connecting members. The opposite sides of the slit material may be provided with overlapping flaps, as shown in Fig. 7, for the purpose of covering the interlocking connecting members, and these flaps may be easily raised to operate the slider.

In Figs. 4, 5 and 6 is shown another embodiment of this invention in which the tire cover comprises two slits 22 and 23, also preferably controlled by slide fasteners and movable toward and from substantially the same point 24. Here the tire cover 21 is also made in one piece but the portion 26 between the slits may be folded back as shown in Fig. 5 to facilitate removal of the rest of the covering.

Instead of completely enclosing one face of the tire, the cover 21 extends from the inside edge 29 around the tire periphery and inward along the other side to a point 30 substantially opposite the inner edge 29. Each slit 22 and 23 is of substantially the same length extending from its open end 25, over the tire and down to the opposite or closed end of the slit 27. Some form of fastening means, preferably the slide type of fastener previously described, is employed to control each of these slits, when the portion 26 of the cover may be quickly rolled back and the remainder of the cover taken off the tire. The cover shown in Figs. 4 to 7 is also provided with overlapping flaps to protect the connecting members.

The sliders 28 controlling the slits 22 and 23 may in either this embodiment of the invention, or that previously described in Figs. 1 to 3, inclusive, be of the type having its diverging channels disposed at a wide angle as in said Patent No. 1,243,458, in order to be readily moved to open the slit by pulling apart the opposite edges without pulling the slider. Or, the slider in each of these embodiments may be made with its diverging channels disposed at a small angle, as in my Patent No. 1,302,606, May 6, 1919, which type of slider is especially adapted for the less flexible types of material. Where the wide angle slider referred to is used it should be noted that this fastener will not come loose when fully closed, since the material on the inner edge of the slit is not in tension, but only that portion of the material on the outside of, or over the edge of the tire is drawn tight.

Among the advantages of this invention may be included the reduced cost and simplicity of construction for this cover, doing away with the necessity of any overlapping flaps fastening onto one another. Another advantage of this improved cover is its facility of manipulation when applied to objects slightly larger than that for which it is intended. In such a case there is no requirement for pulling and stretching of the material, or the inconvenience attendant upon endeavoring to close snap fasteners under tension. With the slide type of fastener it is readily adapted to be closed with greater facility when the cover is tighter than are other forms of such covers. When a wide angle or tear slider is used, the single slit or the two slits may each be opened rapidly and in a single movement by simply pulling apart the opposite edges of the material along the slit, thus causing the slider to travel towards the closed end of the slit without necessity for positively pulling it to that position.

While the invention has been described in connection with a tire cover it may be readily applied to other objects of analogous shape having convex surfaces over which the slider is adapted to be manipulated. Among such types of coverings may be mentioned those for musical instruments such as violins, banjos, mandolins or drums, and particularly covers for game balls of different sorts, such as bowling or basket balls. The invention may also be applied to covers which are adapted to extend around and entirely enclose all surfaces of the object, as, for example, when the inner side of 14 of the cover shown in Figs. 1 to 3 be extended inwardly to the center or axis of the tire. Such a cover is not adapted for the spare shoe indicated in Fig. 1, because the supporting means for the tire, not shown, precludes such use, but when the inner side of the covering is of longer extent it will be understood that the slit 15 will also have to be of greater extent.

I claim:

A flexible cover extending on one side, enclosing the edges, and provided with an overlapping portion on the opposite side of an article, said cover being provided with a single slit extending from the overlapping edge of said cover, over the edge of the article and inwardly along the first side far enough to permit removal of said cover, and means for closing said slit.

Signed at Meadville, in the county of Crawford and State of Pennsylvania, this 2nd day of January, 1923.

GIDEON SUNDBACK.